128,869

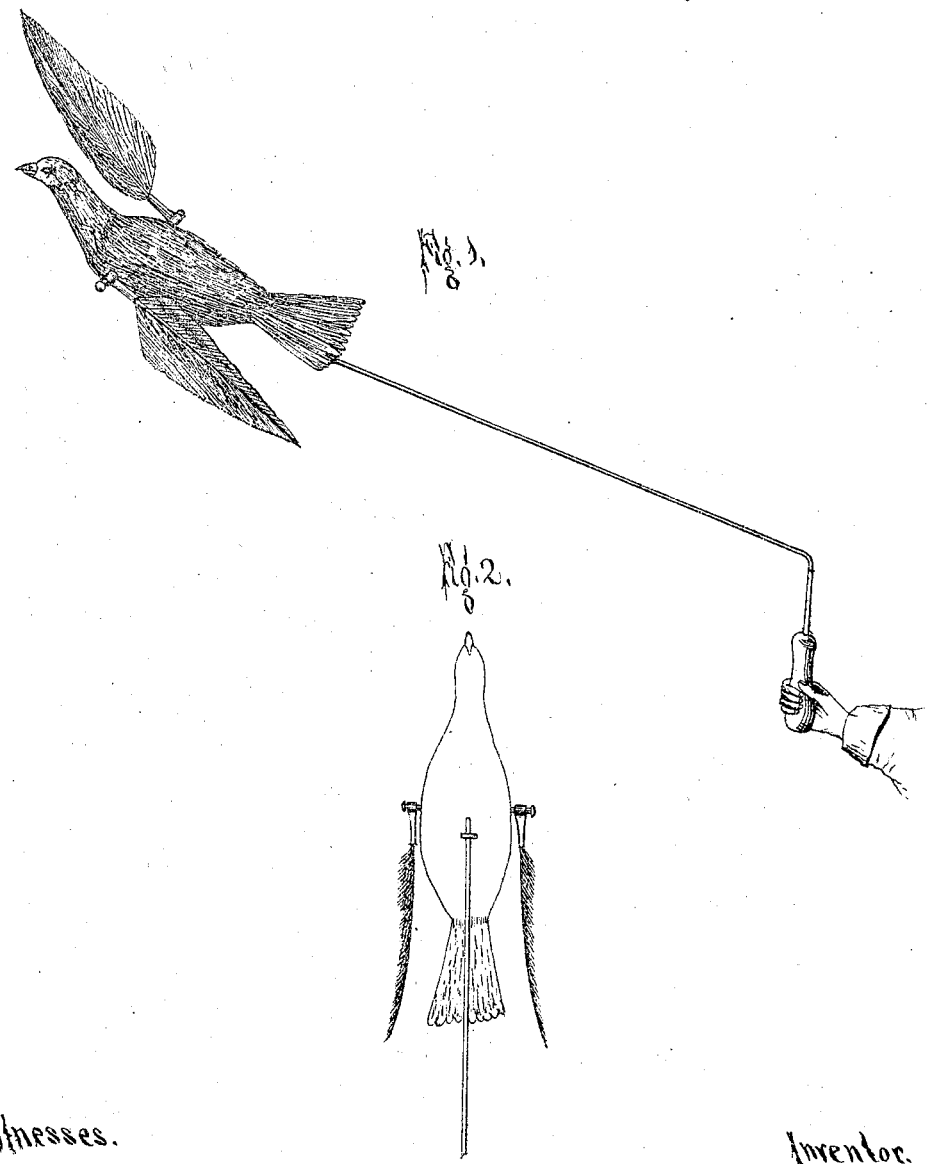

UNITED STATES PATENT OFFICE.

AMBROSE FFOLLIOTT, OF UNIONTOWN, DISTRICT OF COLUMBIA.

IMPROVEMENT IN TOYS.

Specification forming part of Letters Patent No. 128,869, dated July 9, 1872.

Specification describing an Improved Toy-Bird, invented by AMBROSE FFOLLIOTT, of Uniontown, in the county of Washington and District of Columbia.

The drawing hereof shows the subject of this invention. It consists of an artificial bird, the wings of which are so constructed and attached to the body of the bird as to allow of rotation or vibration when the proper motion is given, thus closely imitating the fluttering of a bird.

To the body of the bird is attached the one end of a wire or rod, the other end of which is fitted into a handle to be held by the hand of the child, as shown by Figure 1. Fig. 2 is a bottom view of the bird.

Simple rotation of the bird by means of the rod and handle will illustrate the motion of the wings, which are here shown attached by a swivel joint to the body of the bird; but the wings may be affixed by the universal or any joint that will allow of the desired rotary motion.

The bird here shown is solid, but it may be made hollow, and have within it means for allowing the passage of air through a portion, so that when the bird is put in motion a whistling sound or notes similar to birds' notes will be produced.

The body and wings of the birds may be made of thin sheet metal. The body may be made of clay, or porcelain, or wood, or cork. The wings may be made of feathers, paper, or any other light material.

What I claim is—

A toy-bird with rotating wings, constructed substantially as herein set forth.

This specification signed this 15th day of May, 1872.

AMBROSE FFOLLIOTT.

Witnesses:
   THOS. T. EVERETT,
   EDM. F. BROWN.